United States Patent
Ayllón Álvarez et al.

(10) Patent No.: US 12,046,231 B2
(45) Date of Patent: Jul. 23, 2024

(54) CONVERSATION FACILITATING METHOD AND ELECTRONIC DEVICE USING THE SAME

(71) Applicant: UBKang (Qingdao) Technology Co., Ltd., Qingdao (CN)

(72) Inventors: David Ayllón Álvarez, Reseda, CA (US); Adam David King, Los Angeles, CA (US); Zhen Xiu, Chino Hills, CA (US); Huan Tan, Pasadena, CA (US)

(73) Assignee: UBKANG (QINGDAO) TECHNOLOGY CO., LTD., Qingdao (CN)

( * ) Notice: Subject to any disclaimer, the term of this patent is extended or adjusted under 35 U.S.C. 154(b) by 342 days.

(21) Appl. No.: 17/394,416

(22) Filed: Aug. 5, 2021

(65) Prior Publication Data
US 2023/0041272 A1    Feb. 9, 2023

(51) Int. Cl.
| | | |
|---|---|---|
| *G10L 15/16* | (2006.01) | |
| *G10L 15/22* | (2006.01) | |
| *G10L 15/26* | (2006.01) | |
| *G10L 17/00* | (2013.01) | |
| *G10L 17/22* | (2013.01) | |

(52) U.S. Cl.
CPC .............. *G10L 15/16* (2013.01); *G10L 15/22* (2013.01); *G10L 2015/227* (2013.01)

(58) Field of Classification Search
CPC ......... G10L 15/26; G10L 15/22; G10L 17/00; G10L 17/22; G10L 15/16
USPC .................... 704/9, 232, 270, 275
See application file for complete search history.

(56) References Cited

U.S. PATENT DOCUMENTS

| | | | | |
|---|---|---|---|---|
| 8,069,131 | B1 * | 11/2011 | Luechtefeld | G06Q 10/10 |
| | | | | 706/50 |
| 2016/0307571 | A1 * | 10/2016 | Mizumoto | H04L 12/1831 |
| 2018/0374494 | A1 * | 12/2018 | Yamaya | G06V 40/20 |
| 2020/0020333 | A1 * | 1/2020 | Amores | G10L 15/22 |
| 2020/0210464 | A1 * | 7/2020 | Newell | G10L 15/1822 |
| 2021/0400142 | A1 * | 12/2021 | Jorasch | H04L 65/1069 |
| 2022/0093101 | A1 * | 3/2022 | Krishnan | G10L 15/24 |
| 2022/0241985 | A1 * | 8/2022 | Scherer | B25J 11/0015 |
| 2022/0309949 | A1 * | 9/2022 | Dasgupta | G10L 15/1815 |

* cited by examiner

*Primary Examiner* — Richemond Dorvil
*Assistant Examiner* — Rodrigo A Chavez

(57) ABSTRACT

A method for facilitating a multiparty conversation is disclosed. An electronic device using the method may facilitate a multiparty conversation by identifying participants of a conversation, localizing relative positions of the participants, detecting speeches of the conversation, matching one of the participants to each of the detected speeches according to the relative positions of the participants, counting participations of the matched participant in the conversation, identifying a passive subject from all the participants according to the participations of all the participants in the conversation, finding a topic of the conversation between the participants, and engaging the passive subject by addressing the passive subject and speaking a sentence related to the topic.

18 Claims, 12 Drawing Sheets

CONVERSATION FACILITATING METHOD AND ELECTRONIC DEVICE USING THE SAME

BACKGROUND

1. Technical Field

The present disclosure relates to artificial intelligence (AI), and particularly to a conversation facilitating method and an electronic device using the same.

2. Description of Related Art

Service robots assist human beings by performing jobs in various scenarios such as residence, restaurant and factory, which can be divided into several types including domestic robots, social robots, frontline service robots and industrial robots.

The service robots typically are autonomous and/or operated by a built-in control system to perform jobs. In addition to simple jobs that are dirty, dull, distant or dangerous, flourishing artificial intelligence (AI) techniques provide a possibility to allow the service robots to perform complex jobs such as customer service and consultation.

Companion robots are a type of service robots that are created for the purposes of creating real or apparent companionship for human beings. They usually interact with their user through voice, body movement, and even facial expression. In the modern society that people are indifferent to each other, they especially need a new service mode to improve the widespread problems (e.g., loneliness and autism) caused by lacking interactions between people.

BRIEF DESCRIPTION OF THE DRAWINGS

In the drawing(s), the same element will be designated using the same or similar reference numerals throughout the figures. It should be understood that, the drawings in the following description are only examples of the present disclosure. For those skilled in the art, other drawings can be obtained based on these drawings without creative works.

DETAILED DESCRIPTION

Figure 1:
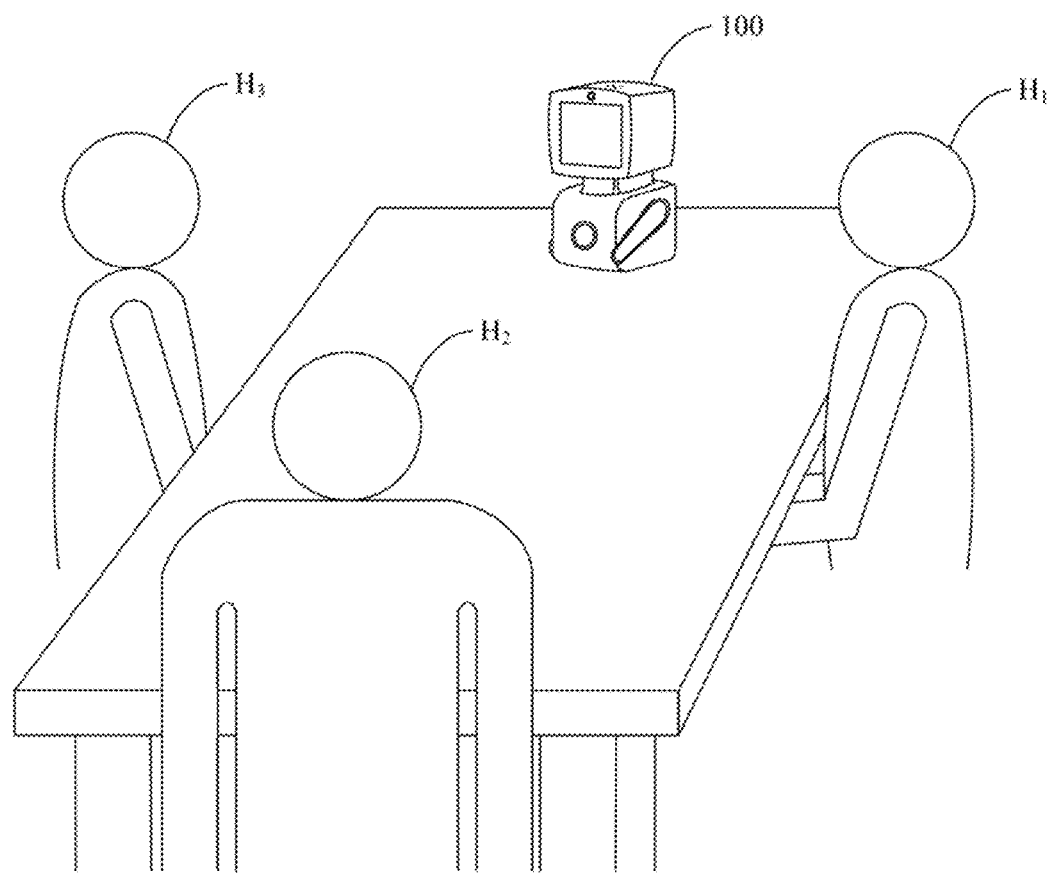
FIG. 1 is a schematic diagram of a scenario of multiparty conversation according to some embodiments of the present disclosure.

In order to make the objects, features and advantages of the present disclosure more obvious and easy to understand, the technical solutions in this embodiment will be clearly and completely described below with reference to the drawings. All other embodiments obtained by those skilled in the art based on the embodiments of the present disclosure without creative efforts are within the scope of the present disclosure.

It is to be understood that, when used in the description and the appended claims of the present disclosure, the terms "including". "comprising", "having" and their variations indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

In the present disclosure, the terms "first". "second", and "third" are for descriptive purposes only, and are not to be comprehended as indicating or implying the relative importance or implicitly indicating the amount of technical features indicated. Thus, the feature limited by "first", "second", and "third" may include at least one of the feature either explicitly or implicitly. In the description of the present disclosure, the meaning of "a plurality" is at least two, for example, two, three, and the like, unless specifically defined otherwise.

In the present disclosure, the descriptions of "one embodiment", "some embodiments" or the like described in the specification mean that one or more embodiments of the present disclosure can include particular features, structures, or characteristics which are related to the descriptions of the descripted embodiments. Therefore, the sentences "in one embodiment", "in some embodiments", "in other embodiments", "in other embodiments" and the like that appear in different places of the specification do not mean that descripted embodiments should be referred by all other embodiments, but instead be referred by "one or more but not all other embodiments" unless otherwise specifically emphasized.

The present disclosure relates to the facilitation of a multiparty conversation. As used herein, the term "conversation" refers to interactive communication between two or more people. The term "passive subject" refers to the participant of a conversation who seems passive because of, for example, low speaking frequency or short speaking duration. The term "speech" refers to human vocal expression using language. The term "sensor" refers to a device, module, machine, or subsystem such as ambient light sensor and image sensor (e.g., camera) whose purpose is to detect events or changes in its environment and send the information to other electronics (e.g., processor).

FIG. 1 is a schematic diagram of a scenario of multiparty conversation according to some embodiments of the present disclosure. In a scenario (e.g., a medical treatment) of a multiparty conversation with a plurality of (human) participants (i.e. parties or subjects) (e.g., participants $H_1$-$H_3$ that one or more of them may have autism or other conversational barrier) who interact by speaking face to face, a robot 100 may be used to facilitate the conversation by detecting and engaging the passive subject among the participants of the conversation. The robot 100 may be a service robot such as a companion robot (for the users such as elderly and children). Since the robot 100 will engage the passive subject among the participants by speaking a sentence related to the topic of the conversation to the passive subject, it can be regarded as a party of the conversation in addition to the human participants $H_1$-$H_3$. The robot 100 may have a desktop size that can be positioned on a table among the (sitting) participants of the conversation.

The robot 100 may be actuated to facilitate the conversation through the robot 100 itself (e.g., a control interface on the robot 100) or a control device 200 (not shown) such as a remote control, a smart phone, a tablet computer, a notebook computer, a desktop computer, or other electronic device by, for example, providing a request for the service of the robot 100. The robot 100 and the control device 200 may communicate over a network which may include, for example, the Internet, intranet, extranet, local area network (LAN), wide area network (WAN), wired network, wireless networks (e.g., Wi-Fi network, Bluetooth network, and mobile network), or other suitable networks, or any combination of two or more such networks. In other embodiments, the robot 100 may further facilitate the conversation by providing other services such as information inquiry and information search, and may further provide other functions such as consultation. In addition, other electronic device (e.g., a smart phone) may be used to facilitate the conversation by detecting and engaging the passive subject among the participants of the conversation.

Figure 2:
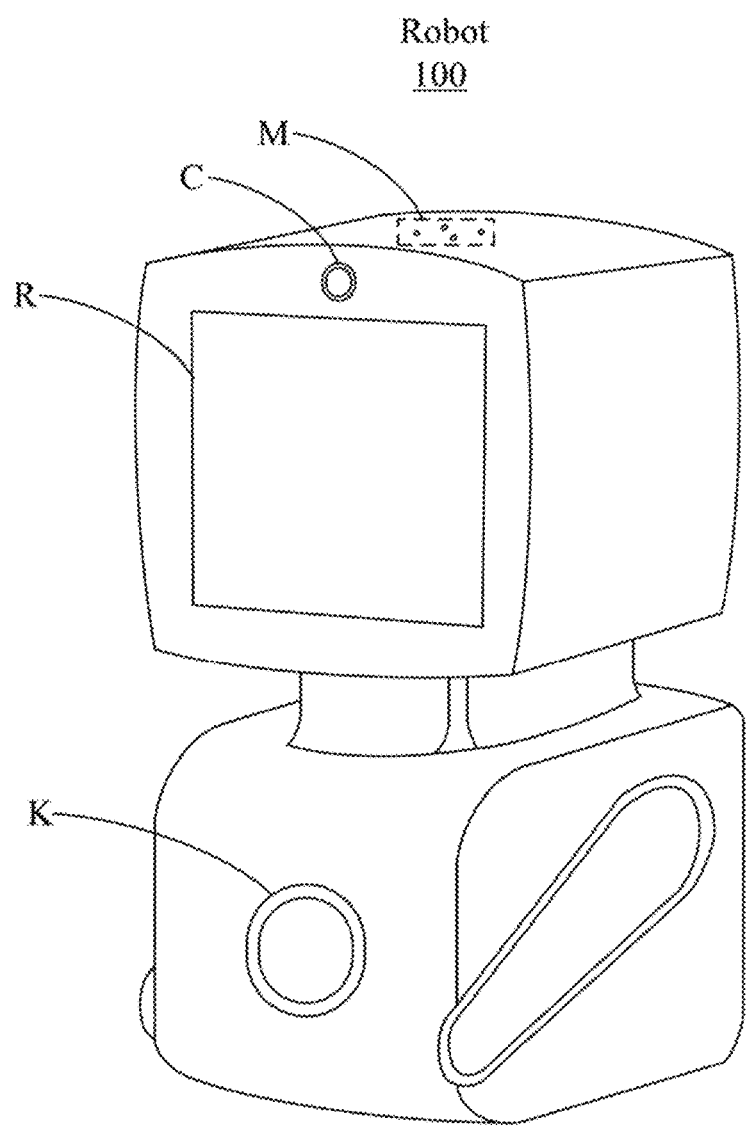
FIG. 2 is a perspective view of a robot according to some embodiments of the present disclosure.

FIG. 2 is a perspective view of the robot 100 according to some embodiments of the present disclosure. In some embodiments, the robot 100 may be a mobile robot such as a wheeled robot, which may include microphone(s) M, camera(s) C, a screen R, and speaker(s) K. In the case that the robot 100 is a service robot, which may have a human-like structure including a head, a body, two arms, and the like, and the microphone(s) M, the camera(s) C, the screen R and the speaker(s) K may be used to communicate with the user of the robot 100 (i.e., the participants of the conversation). For example, the camera(s) C may be used to detect and recognize the user, the microphone(s) M may receive voice of the user, the speaker(s) K may be used to play audio to the user, and the screen R may show facial expressions to the user. It should be noted that, the robot 100 is only one example of robot, and the robot 100 may have different size (e.g., have a human-like size rather than a desktop size), have more or fewer parts than shown in above or below (e.g., have legs rather than wheels), or may have a different configuration or arrangement of the parts (e.g., have the speaker(s) K disposed on the head of the robot 100 rather than the body of the robot 100).

The microphone(s) M may be disposed on the top of (the head of) the robot 100, which may be a microphone array 2100 (see FIG. 6) including a plurality of microphones M (e.g., 4 microphones M as shown in the figure). The camera(s) C may be disposed (on the head of the robot 100 and) toward a forward direction which the robot 100 straightly faces (and moves) such that, for example, lens of the camera(s) C straightly faces toward the forward direction. The position and/or the pitch angle of (the lens of) the camera(s) C may be (automatically) adjusted so as to point toward the participants $H_1$-$H_3$. The screen R may be disposed (on the head of the robot 100 and) toward the above-mentioned forward direction. The speaker(s) K may be disposed (on the body of the robot 100 and) toward the above-mentioned forward direction.

In addition, the robot 100 may be navigated in its environment (e.g., a table or a conference room) to, for example, detect the participants in the conversation in a dynamic manner, so that all the participants in the conversation can be detected and served while dangerous situations such as collisions and unsafe conditions (e.g., falling, extreme temperature, radiation, and exposure) may be prevented. The robot 100 may be automatically navigated from a starting point, that is, the location where the robot 100 originally locates, to a destination, that is, the location of the goal of navigation which is indicated by the navigation/operation system of the robot 100, while obstacles (e.g., furniture, walls, humans, pets, and garbage) may be avoided so as to prevent the above-mentioned dangerous situations. The trajectory for the robot 100 to move from the starting point to the destination may be planned so as to move the robot 100 according to the trajectory. The trajectory may be planned according to, for example, a shortest path in the built map to the destination. In addition, the collision avoidance to obstacles in the built map (e.g., walls and furniture) or that detected in real time (e.g., humans and pets) may also be considered when planning, so as to accurately and safely navigate the robot 100.

Figure 3:
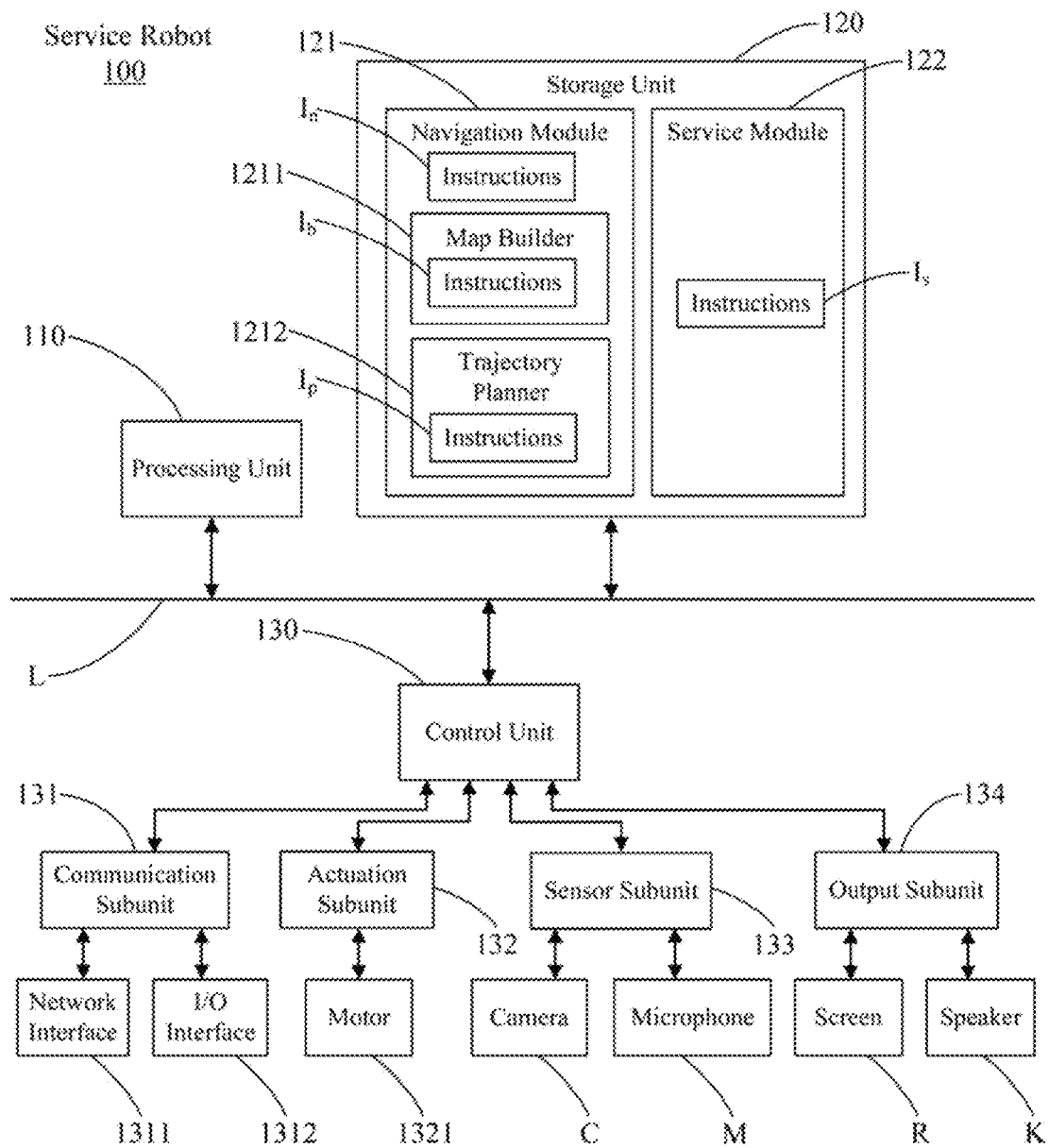
FIG. 3 is a schematic block diagram illustrating the robot of FIG. 2.

FIG. 3 is a schematic block diagram illustrating the robot 100 of FIG. 2. The robot 100 may include a processing unit 110, a storage unit 120, and a control unit 130 that communicate over one or more communication buses or signal lines L. It should be noted that, the robot 100 is only one example of robot, and the robot 100 may have more or fewer components (e.g., unit, subunits, and modules) than shown in above or below, may combine two or more components, or may have a different configuration or arrangement of the components. The processing unit 110 executes various (sets of) instructions stored in the storage unit 120 that may be in form of software programs to perform various functions for the robot 100 and to process related data, which may include one or more processors (e.g., CPU). The storage unit 120 may include one or more memories (e.g., high-speed random access memory (RAM) and non-transitory memory), one or more memory controllers, and one or more non-transitory computer readable storage media (e.g., solid-state drive (SSD) or hard disk drive). The control unit 130 may include various controllers (e.g., camera(s) Controller, display controller, and physical button controller) and peripherals interface for coupling the input and output peripheral of the robot 100, for example, external port (e.g., USB), wireless communication circuit (e.g., RF communication circuit), audio circuit (e.g., speaker circuit), sensor (e.g., inertial measurement unit (IMU)), and the like, to the processing unit 110 and the storage unit 120.

In some embodiments, the storage unit 120 may include a navigation module 121 for implementing navigation functions (e.g., map building and trajectory planning) related to the navigation (and trajectory planning) of the robot 100 and a service module 122 for implementing service functions. The service functions may include the above-mentioned conversation facilitation, and may further include other functions for facilitating the conversation or serve the participants of the conversation (e.g., consultation). The navigation module 121 and the service module 122 may be stored in the one or more memories (and the one or more non-transitory computer readable storage media).

The navigation module 121 may be a software module (of the operation system of the robot 100) which has instructions $I_n$ (e.g., instructions for actuating motor(s) of the robot 100 to move the robot 100) for implementing the navigation of the robot 100, a map builder 1211, and trajectory planner(s) 1212, and the service module 122 may also be a software module (of the operation system of the robot 100) which has instructions $I_s$ (e.g., instructions for detecting and engaging the passive subject in the conversation) for implementing service functions. The map builder 1211 may be a software module having instructions $I_b$ for building map for the robot 100. The trajectory planner(s) 1212 may be software module(s) having instructions $I_p$ for planning trajectories for the robot 100. The trajectory planner(s) 1212 may include a global trajectory planner for planning global trajectories for the robot 100 and a local trajectory planner for planning local trajectories for the robot 100. The global trajectory planner may be, for example, a trajectory planner based on Dijkstra's algorithm, which plans global trajectories based on map(s) built by the map builder 1211 through, for example, simultaneous localization and mapping (SLAM). The local trajectory planner may be, for example, a trajectory planner based on TEB (timed elastic band) algorithm, which plans local trajectories based on the global trajectory $P_g$, and other data collected by the robot 100. For example, images may be collected through the camera(s) C (or other forward-facing camera) of the robot 100, and the collected images may be analyzed so as to identify obstacles, so that the local trajectory can be planned with reference to the identified obstacles, and the obstacles can be avoided by moving the robot 100 according to the planned local trajectory. Each of the map builder 1211 and the trajectory planner(s) 1212 may be a submodule separated from the instructions $I_n$ or other submodules of the navigation module 121, or a part of the instructions $I_n$ for implementing the navigation of the robot 100. The trajectory planner(s) 1212 may further have data (e.g., input/output data and temporary data) related to the trajectory planning of the robot 100 which may be stored in the one or more memories and accessed by the processing unit 110. In some embodiments, each of the trajectory planner(s) 1212 may be a module in the storage unit 120 that is separated from the navigation module 121.

In some embodiments, the instructions $I_n$ may include instructions for implementing collision avoidance of the robot 100 (e.g., obstacle detection and trajectory replanning). In addition, the global trajectory planner may replan the global trajectory(s) (i.e., plan new global trajectory(s)) to detour in response to, for example, the original global trajectory(s) being blocked (e.g., blocked by an unexpected obstacle) or inadequate for collision avoidance (e.g., impossible to avoid a detected obstacle when adopted). In other embodiments, the navigation module 121 may be a navigation unit communicating with the processing unit 110, the storage unit 120, and the control unit 130 over the one or more communication buses or signal lines L, and may further include one or more memories (e.g., high-speed random access memory (RAM) and non-transitory memory) for storing the instructions $I_n$, the map builder 1211, and the trajectory planner(s) 1212, and one or more processors (e.g., MPU and MCU) for executing the stored instructions $I_n$, $I_b$ and $I_p$, to implement the navigation of the robot 100.

The robot 100 may further include a communication subunit 131 and an actuation subunit 132. The communication subunit 131 and the actuation subunit 132 communicate with the control unit 130 over one or more communication buses or signal lines that may be the same or at least partially different from the above-mentioned one or more communication buses or signal lines L. The communication subunit 131 is coupled to communication interfaces of the robot 100, for example, network interface(s) 1311 for the robot 100 to communicate with the control device 200 via the network, I/O interface(s) 1312 (e.g., a physical button), and the like. The actuation subunit 132 is coupled to component(s)/device(s) for implementing the motions of the robot 100 by, for example, actuating motor(s) of the wheels and/or joints of the robot 100. The communication subunit 131 may include controllers for the above-mentioned communication interfaces of the robot 100, and the actuation subunit 132 may include controller(s) for the above-mentioned component(s)/device(s) for implementing the motions of the robot 100.

The robot 100 may further include a sensor subunit 133 which may include a set of sensor(s) and related controller(s), for example, the camera(s) C and the microphone(s) M, for detecting the environment in which it is located. The sensor subunit 133 communicates with the control unit 130 over one or more communication buses or signal lines that may be the same or at least partially different from the above-mentioned one or more communication buses or signal lines L. In other embodiments, in the case that the navigation module 121 is the above-mentioned navigation unit, the sensor subunit 133 may communicate with the navigation unit over one or more communication buses or signal lines that may be the same or at least partially different from the above-mentioned one or more communication buses or signal lines L. In addition, the sensor subunit 133 may just abstract component for representing the logical relationships between the components of the robot 100.

The robot 100 may further include an output subunit 134 which may include a set of output device(s) and related controller(s), for example, the screen R and the speaker(s) K, for outputting information to its user (e.g., the participants $H_1$-$H_3$). The output subunit 134 communicates with the control unit 130 over one or more communication buses or signal lines that may be the same or at least partially different from the above-mentioned one or more communication buses or signal lines L. In other embodiments, the output subunit 134 may just abstract component for representing the logical relationships between the components of the robot 100.

In some embodiments, the map builder 1211, the trajectory planner(s) 1212, the sensor subunit 133, and the motor(s) (and the wheels and/or joints of the robot 100 coupled to the motor(s)) jointly compose a (navigation) system which implements map building, (global and local) trajectory planning, and motor actuating so as to realize the navigation of the robot 100. In addition, the various components shown in FIG. 2 may be implemented in hardware, software or a combination of both hardware and software. Two or more of the processing unit 110, the storage unit 120, the control unit 130, the navigation module 121, and other units/subunits/modules may be implemented on a single chip or a circuit, in other embodiments, at least a part of them may be implemented on separate chips or circuits. In addition, the communication subunit 131, actuation subunit 132, the sensor subunit 133, and/or the output subunit 134 may just abstract component for representing the logical relationships between the components of the robot 100.

Figure 4:
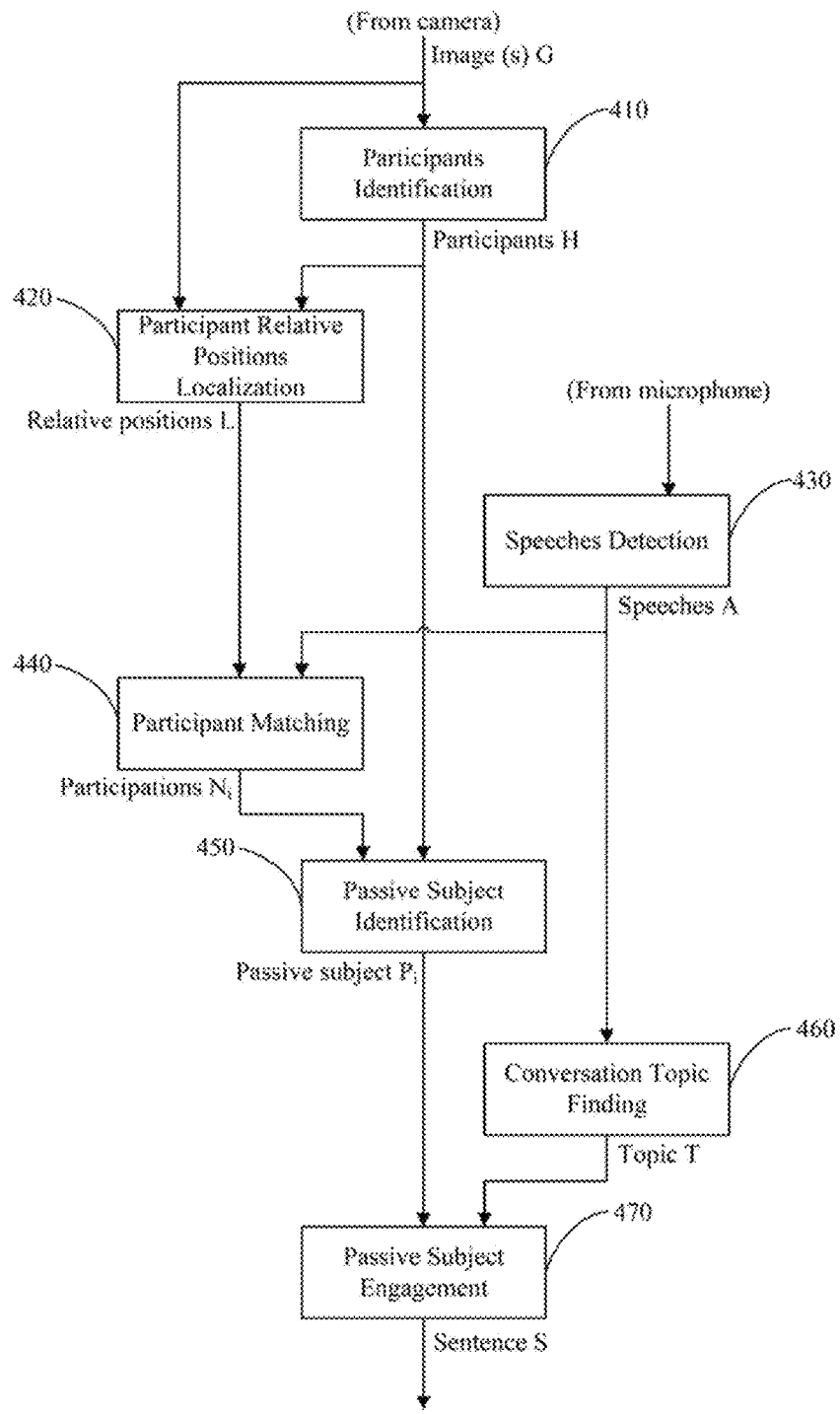
FIG. 4 is a schematic block diagram of an example of performing conversation facilitation using the robot of FIG. 2.

FIG. 4 is a schematic block diagram of an example of performing conversation facilitation using the robot 100 of FIG. 2. In some embodiments, a conversation facilitating method is implemented in the robot 100 to facilitate a conversation through, for example, storing (sets of) the instructions $I_s$ corresponding to the conversation facilitating method as the service module 122 in the storage unit 120 and executing the stored instructions $I_s$ through the processing unit 110, and then the robot 100 may facilitate the conversation by detecting and engaging the passive subject $P_i$ among the participants H of the conversation. The conversation facilitating method may be performed in response to, for example, a request for facilitating the conversation from (the operation system of) the robot 100 itself or the control device 200, then it may also be re-performed in response to, for example, the changes in the topic or the participants H of the conversation.

Figure 5:
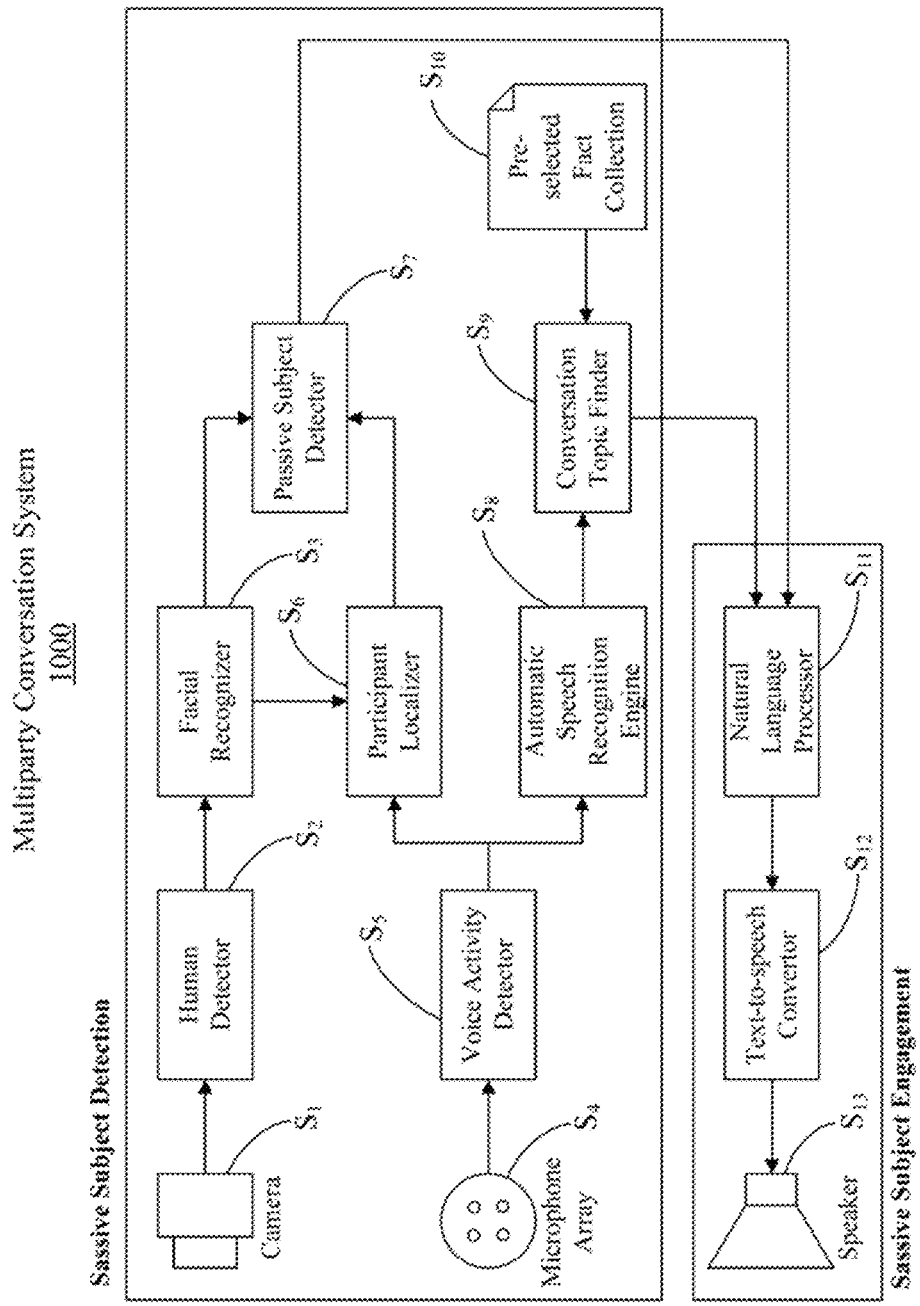
FIG. 5 is a schematic block diagram of a conversation facilitating system of the robot of FIG. 2.

According to the conversation facilitating method, the processing unit 110 may identify participants H (e.g., the participants $H_1$-$H_3$ in FIG. 1) of the conversation based on image(s) G of the participants H (block 410). The image(s) G of the participants H are obtained through the camera(s) C. The camera(s) C may be, for example, an RGB-D camera which provides a continuous stream of the images G (which include color images and depth images). FIG. 5 is a schematic block diagram of a conversation facilitating system 1000 of the robot 100 of FIG. 2. The robot 100 may have the conversation facilitating system 1000 that integrate hardware, software, and/or firmware resources of the robot 100 for implementing the conversation facilitating method. The conversation facilitating system 1000 includes components $S_1$-$S_{13}$ that may be divided into two main parts of "passive subject detection" and "passive subject engagement", where the former one (including the components $S_1$-$S_{10}$) aims at detecting the passive subject in the conversation, and the latter one (including the components $S_{11}$-$S_{13}$) is focused on the engagement of the passive subject $P_i$ into the conversation. It should be noted that, each of the components $S_1$-$S_{13}$ in the conversation facilitating system 1000 may be implemented in hardware (as, for example, a circuit such as the camera $S_1$ that includes lens and a printed circuit board (PCB) for controlling the lens), software (as, for example, a module such as the human detector $S_2$ that detects humans in image using a machine-learned model) or a combination of both hardware and software.

The function of one block of FIG. 4 may be implemented through one or more of the components $S_1$-$S_{13}$ of the conversation facilitating system 1000. In some embodiments, the camera $S_1$ of the conversation facilitating system 1000 may be the camera(s) C (and related control firmware/software), and the participants identification of block 410 of FIG. 4 may be implemented through the human detector $S_2$ and the facial recognizer $S_3$ of the conversation facilitating system 1000 based on the image(s) G of the participants H obtained through the camera $S_1$. In the human detector $S_2$, the participants H in the image(s) G are detected using a deep learning model that may be a computer model based on, for example, YOLO (you only look once) algorithm. The deep learning model is trained by using a large set of labeled data with respect to the detection of human (e.g., a data set of more than 10,000 images of humans in various scenes), and neural network architectures that contain a plurality of layers, so as to learn to perform classification tasks directly from the inputted image(s) G, thereby detecting the participants H of the conversation in the image(s) G. In the facial recognizer $S_3$ of the conversation facilitating system 1000, visual scene analysis may be employed to detect the participants H in the scene of the conversation and identify them by a pre-built database of 256-dimension face features extracted by a deep learning neural network, where all the participants H have been previously enrolled in the database including the face features of each participant H and the name of the participant H. The facial recognizer $S_3$ may detect the human faces in the live streaming video (i.e., the images G) and extracts human face features in real time.

In the conversation facilitating method, the processing unit 110 may further localize relative positions L of the participants H based on the image(s) G (block 420 of FIG. 4). In some embodiments, the participant relative positions localization of block 420 may be implemented through the facial recognizer $S_3$ of the conversation facilitating system 1000. After identifying the name of the participant H based on the above-mentioned database, the facial recognizer $S_3$ further sends the name to the passive subject detector $S_7$ and locates the relative position L of the participant H. The location of each participant H is gathered visually, and is supported by the participant localizer $S_6$ of the conversation facilitating system 1000 which uses acoustic information to confirm the location of the participant H.

Figure 6:
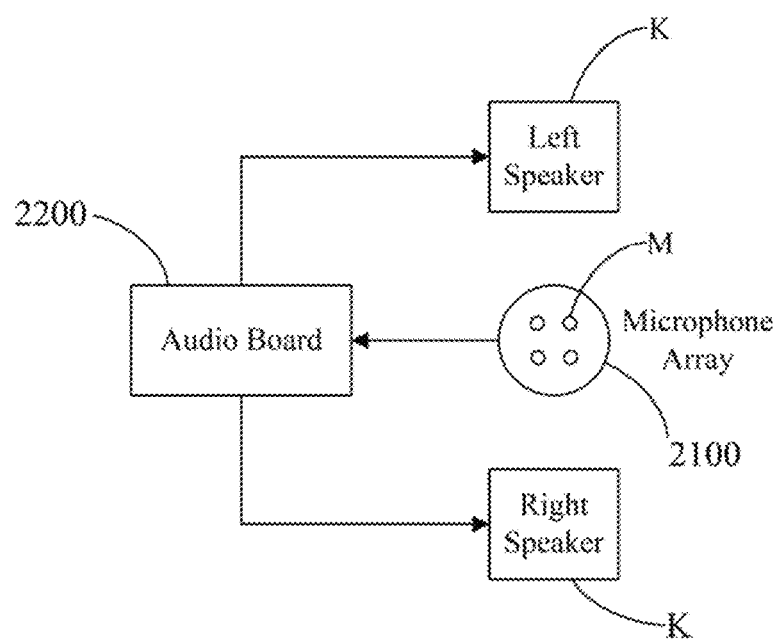
FIG. 6 is a schematic block diagram of an audio circuit of the robot of FIG. 2.

In the conversation facilitating method, the processing unit 110 may further detect speeches A of the conversation (block 430 of FIG. 4). The speeches A of the conversation are detected based on voices obtained through microphone(s) M. FIG. 6 is a schematic block diagram of an audio circuit 2000 of the robot 100 of FIG. 2. The audio circuit 2000 includes the microphone array 2100, an audio board 2200, and 2 speakers S. The microphone(s) M may be microelectromechanical systems (MEMS) microphones, and the microphone array 2100 may be composed of 4 microphones M distributed in a circular fashion connected to the audio board 2200 that pre-processes the received multi-channel signal to reduce noise and reverberation. That is, the microphone array 2100 is a 4-channels microphone array. In addition, the 2 speakers K (i.e., the left speaker and the right speaker) may be connected to the stereo output channel of the audio board 2200, and the audio board 2200 may also include acoustic echo cancellation function to cancel the feedback between the speakers S and the microphones M. In some embodiments, the microphone array $S_4$ of the conversation facilitating system 1000 may be the microphone array 2100 (and the audio board 2200), and the speeches detection of block 430 of FIG. 4 may be implemented through the voice activity detector $S_5$ of the conversation facilitating system 1000 based on the voices obtained through microphone(s) M. In the voice activity detector $S_5$, the speech A of the conversation is detected from an audio received through the microphone(s) M using voice activity detection (VAD), and the detected speech A (in audio) is sent to the participant localizer $S_6$ and the automatic speech recognition engine $S_8$.

The VAD is used to detect the boundaries of each sentence from the voices obtained through microphone(s) M and take the sentence as the detected speech A of the conversation. The goal of the voice activity detector $S_5$ is to reliably determine if speech A is present or not, despite any source of noise in the background. Even in a perfectly silent condition with no background noise, a simple energy detector will do an imperfect job at discerning speech and noise. However, in real conditions, the sounds of speech must contend with multiple sources of noise and acoustic reverberations, meaning that the performance of a simple VAD will be highly degraded. Therefore, the voice activity detector $S_5$ may be designed as a robust VAD system using supervised machine learning, training a convolutional neural network (CNN) for binary classification of audio frames between speech % non-speech. The network may be trained on more than 90 hours of labeled audio mixtures of speech with noise and reverberation.

In the conversation facilitating method, the processing unit 110 may further match one of the participants H to each of the detected speeches A according to the relative positions L of the participants H and count participations of the matched participant H in the conversation (block 440 of FIG. 4). The participations of participant $H_i$ is represented by $N_i$. In some embodiments, the participant matching of block 440 may be implemented through the participant localizer $S_6$ of the conversation facilitating system 1000. In the participant localizer $S_6$, once the speech A is detected by the voice activity detector $S_5$, the corresponding participant H will be localized using the above-mentioned 4-channels microphone array 2100. Based on the number and the relative positions L (e.g., the positions from left to right [$H_1$, $H_2$, $H_3$]) of the participants H that are obtained through the visual scene analysis in the facial recognizer $S_3$, each participant H with the direction of arrival (DOA) can be matched and the participations of the matched participant H in the conversation can be counted. The DOA represents the angle of signal (i.e., the voice of the participant H) to arrive the microphone (for a linear microphone array, the range of the DOA is between 0 and 180 degrees), which may be estimated using the generalized cross-correlation with phase transformation (GCC-PHAT) method.

Figure 7:
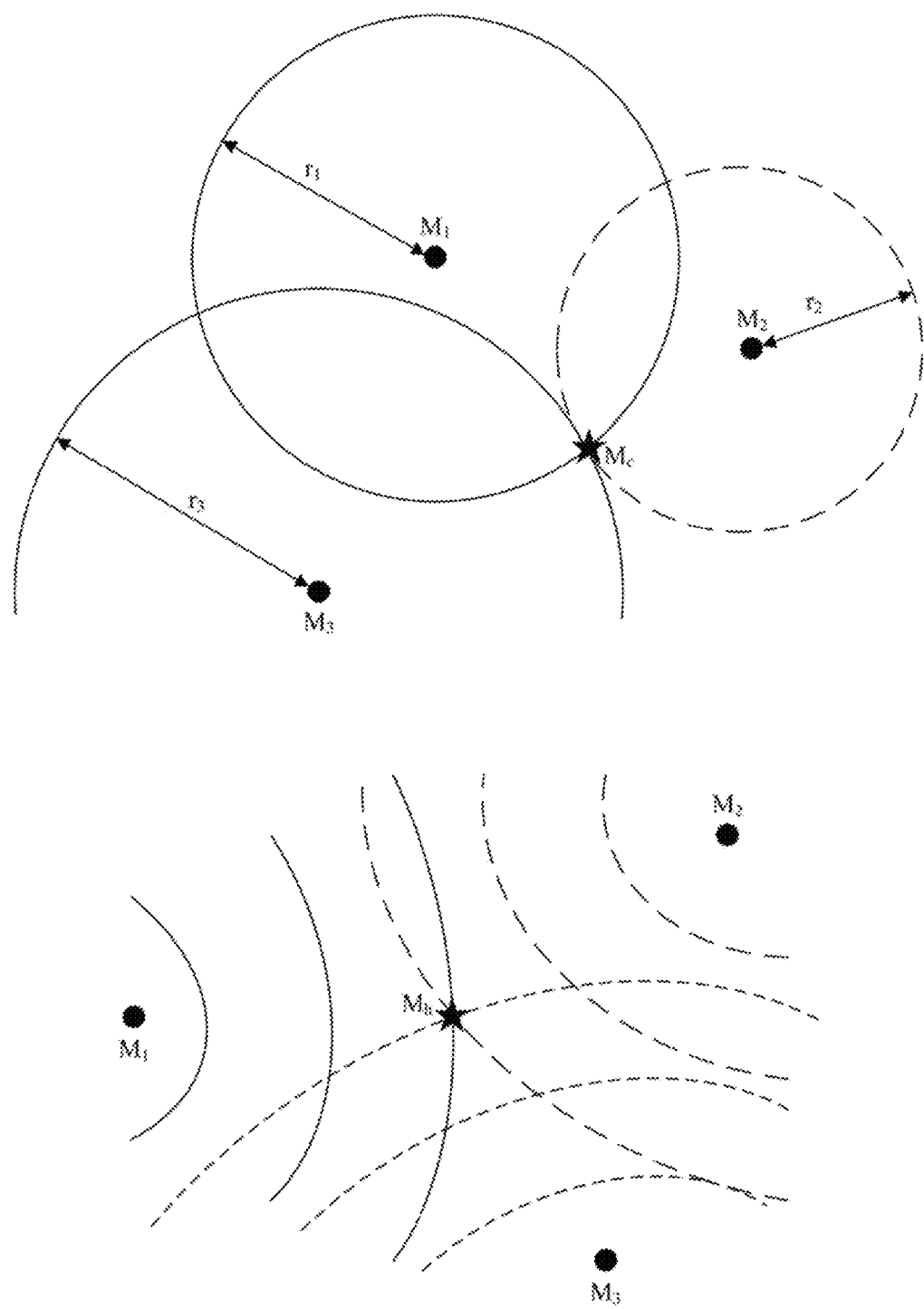
FIG. 7 is a schematic diagram of time difference of arrival based localization.

FIG. 7 is a schematic diagram of time difference of arrival (TDOA) based localization. The GCC-PHAT method is for estimating the TDOA which represents the degree of delay of the voice signal between different channels. The TDOA is a method of positioning using time difference. Taking determining the signal source $M_c$ (i.e., the participant H) through 3 monitoring points $M_1$-$M_3$ (i.e., microphones M of the robot 100) as an example, the distances to the signal source $M_c$ can be determined first by measuring the time when the signal (i.e., voice of the participant H) arrives at the monitoring points $M_1$-$M_3$, then the position of the signal source $M_c$ can be determined based on the distances between the signal source $M_c$ and the monitoring points $M_1$-$M_3$, that is, determined by taking the monitoring points $M_1$-$M_3$ as the center and the above-mentioned distances as the radius $r_1$-$r_3$ to make circles and then the cross point of the circles will be the position of the signal source M) (see the upper part of FIG. 7). By comparing the time difference when the signal arrives at the monitoring points $M_1$-$M_3$, hyperbolas with the monitoring points $M_1$-$M_3$ as the focal point and the distance difference as the long axis can be drawn, then the cross point of the hyperbolas will be the position of the signal source $M_h$ (see the lower part of FIG. 7). Since the topology of the microphones M in the microphone array 2100 is known, the TDOA can be converted to the DOA of the corresponding participant H. Some informal experiments revealed that the root-mean-square error (RMSE) for the DOA estimation using the GCC-PATH methods is lower than 10 degrees in a scenario where the robot 100 is in a table with three participants 11. Considering the minimum distance between humans sitting at a table, this precision is more than acceptable. Consequently, the above-mentioned 4-channels microphone array 2100 will be adequate for the participant localizer $S_6$ of the conversation facilitating system 1000 to use to localize the corresponding participant H.

Figure 8:
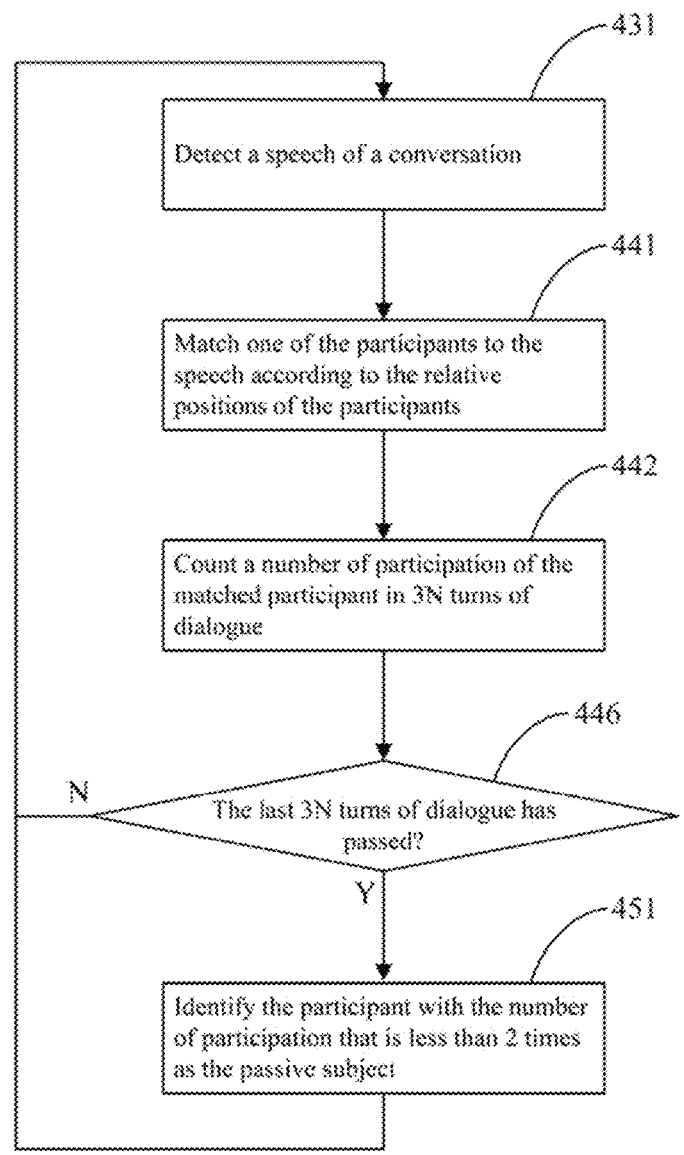
FIG. 8 is a schematic block diagram of an example of passive subject identification in the example of performing conversation facilitating of FIG. 4.

Since the conversation with a plurality of participants H generally includes a plurality of turns of dialogue among the participants H, the passive subject $P_i$ may be identified according to the times of participating of the corresponding participant 1H in the turns of dialogue. FIG. 8 is a schematic block diagram of an example of passive subject identification in the example of performing conversation facilitating of FIG. 4. In some embodiments, for realizing the participant matching and the counting of the participations (block 440 of FIG. 4), at step 441, after a speech A of the conversation is detected (step 431), one of the participants H is matched to the detected speech A according to the relative positions L of the participants H. At step 442, a number of participation of the matched participant H during the last 3N turns of dialogue in the conversation is counted. In which, N is the total number of the participants H. At step 446, a determination is made whether or not the last 3N turns of dialogue has passed. After every 3N turns of dialogue is passed, another 3N turns of dialogue will be recounted. If it is determined that the last 3N turns of dialogue has passed, step 451 will be performed; otherwise, step 431 will be performed to continue monitoring the participations of the participants H.

Figure 9:
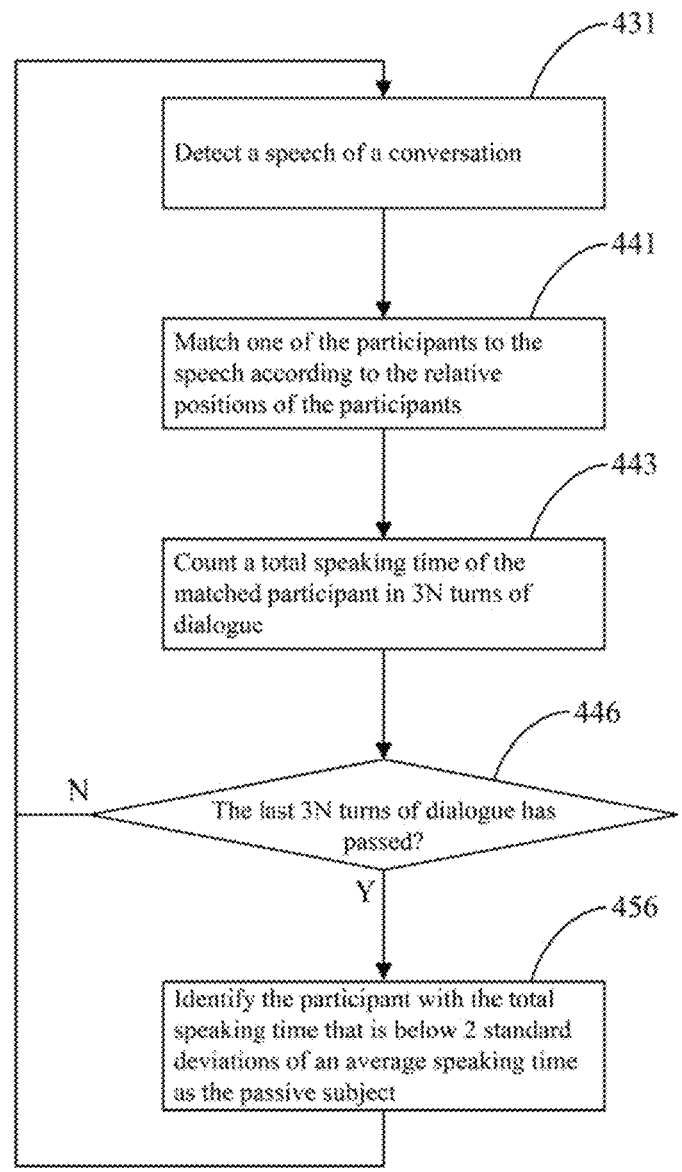
FIG. 9 is a schematic block diagram of another example of passive subject identification in the example of performing conversation facilitating of FIG. 4.

The passive subject $P_i$ may also be identified according to the total speaking time of the corresponding participant H in the turns of dialogue. FIG. 9 is a schematic block diagram of another example of passive subject identification in the example of performing conversation facilitating of FIG. 4. In other embodiments, for realizing the participant matching and the counting of the participations (block 440 of FIG. 4), at step 443, after a speech of the conversation is detected (step 431) and one of the participants H is matched to the detected speech A (step 441), a total speaking time (in seconds) of the matched participant H during the last 3N turns of dialogue is counted, then a determination is made whether or not the last 3N turns of dialogue has passed (step 446). That is, 3N turns or dialogue in the conversation is the sampling interval for the counting of the participations (both the times of participating and the total speaking time). The turns of dialogue of other multiples of N (e.g., 4N and 5N) may also be used according to actual needs (e.g., the topic of the conversation or the size of N).

In the conversation facilitating method, the processing unit 110 may further identify a passive subject $P_i$ from all the participants H according to the participations of all the participants H in the conversation (block 450 of FIG. 4). In some embodiments, the passive subject identification of block 450 may be implemented through the passive subject detector $S_7$ of the conversation facilitating system 1000. The passive subject $P_i$ represents the corresponding participant $H_i$, that is, once participant $H_i$ is identified as a passive subject, she/he will be represented as passive subject $P_i$. In the passive subject detector $S_7$, in order to detect when a participant H shows a passive behavior within the conversation, the number of turns that each participant H interacts in the dialogues of the conversation as well as the total length of each spoken sentence may be tracked. In some embodiments, in the case that the passive subject $P_i$ is identified according to the times of participating in the turns of dialogue, at step 451 of FIG. 5, the participant $H_i$ with the number of participation less than 2 times is identified as the passive subject $P_i$. That is, the times smaller than the multiple (i.e., 3) of N is the threshold of the times of participating for identifying the passive subject $P_i$, and the participant $H_i$ will be identified as the passive subject $P_i$ if the number of participation of the participant $H_i$ is smaller than the threshold of 2. Other threshold (e.g., 1) smaller than the multiple of N may also be used according to actual needs (e.g., the topic of the conversation or the size of N). In other embodiments, in the case that the passive subject $P_i$ is identified according to the total speaking time in the turns of dialogue, at step 456 of FIG. 5, the participant $H_i$ with the total speaking time below 2 standard deviations (the value of "2" is determined from the statistical point of view) of an average speaking time in the conversation is identified as the passive subject $P_i$. That is, the total speaking time smaller than the 2 standard deviations of the average speaking time is the threshold of the total speaking time for identifying the passive subject $P_i$, and the participant $H_i$ will be identified as the passive subject $P_i$ if the total speaking time of the participant $H_i$ is smaller than the threshold of 2 standard deviations of the average speaking time. Other threshold (an integer smaller than 2 and greater than 0) may also be used according to actual needs (e.g., the topic of the conversation or the size of N). After step 451 and 456, step 431 may be performed to identify the passive subject $P_i$ in another 3N turns of dialogue.

Figure 10:
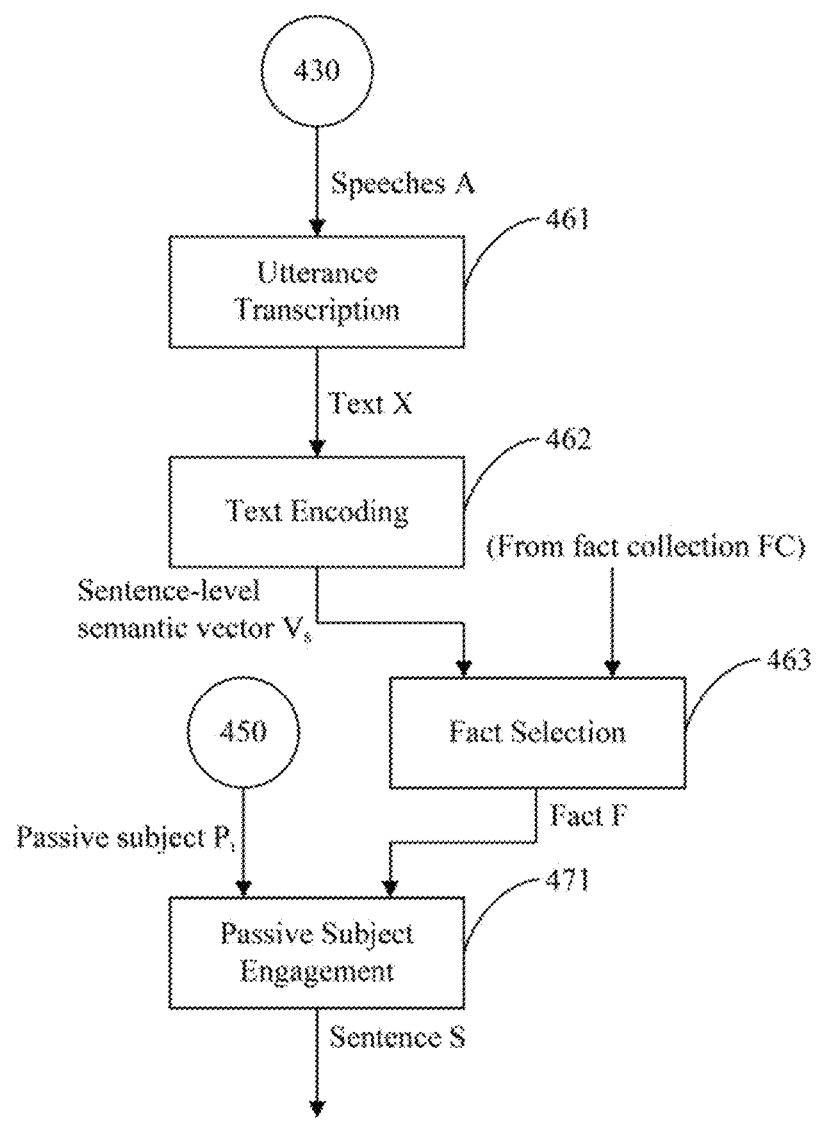
FIG. 10 is a schematic block diagram of an example of topic finding in the example of performing conversation facilitating of FIG. 4.

In the conversation facilitating method, the processing unit 110 may further find a topic T of the conversation between the participants H (block 460 of FIG. 4). FIG. 10 is a schematic block diagram of an example of topic finding in the example of performing conversation facilitating of FIG. 4. In some embodiments, for realizing the conversation topic finding (block 460), the processing unit 110 may transcribe each utterance in the speeches A of the conversation into a text X (block 461 of FIG. 10). In some embodiments, the utterance transcription of block 461 may be implemented through the automatic speech recognition engine $S_8$ of the conversation facilitating system 1000. In the automatic speech recognition engine $S_8$, each utterance in the detected speech A is transcribed into the text X using automatic speech recognition (ASR). The automatic speech recognition engine $S_s$ may be cloud-based. Once the voice activity detector $S_5$ detects the boundaries of a sentence, the corresponding audio (i.e., the detected speech A) is sent to the automatic speech recognition engine $S_8$ for its transcription and stored in a buffer of previous sentences.

For realizing the conversation topic finding (block 460 of FIG. 4), the processing unit 110 may further encode the text X corresponding to spoken sentence(s) in the conversation into a sentence-level semantic vector $V_s$ (block 462 of FIG. 10), and select a fact F with a closest similarity to the sentence-level semantic vector $V_s$ from a pre-selected fact collection FC (block 463 of FIG. 10). The similarity is a cosine similarity, which meets a similarity threshold. Cosine distance goes from 0 to 1 and is an indicator of semantic similarity. In other words, if the cosine distance between 2 vectors representing a word or sentence is 0 means that their similarity is 1. The sentence-level semantic vector $V_s$ is an embedding or dense vector, which represents the meaning of a word or sentence so that it may be compared with other words or sentences. The cosine similarity between embeddings has been shown to be a robust means of gauging semantic similarity at a word-level and at a sentence-level. In other words, if a sentence-level embedding of the most recent turns of dialogue in the current conversation has a high cosine similarity with a piece of fact from the preselected fact collection FC, that piece of fact is likely related to the current topic of the conversation and would be an interesting addition to the conversation.

Figure 11:
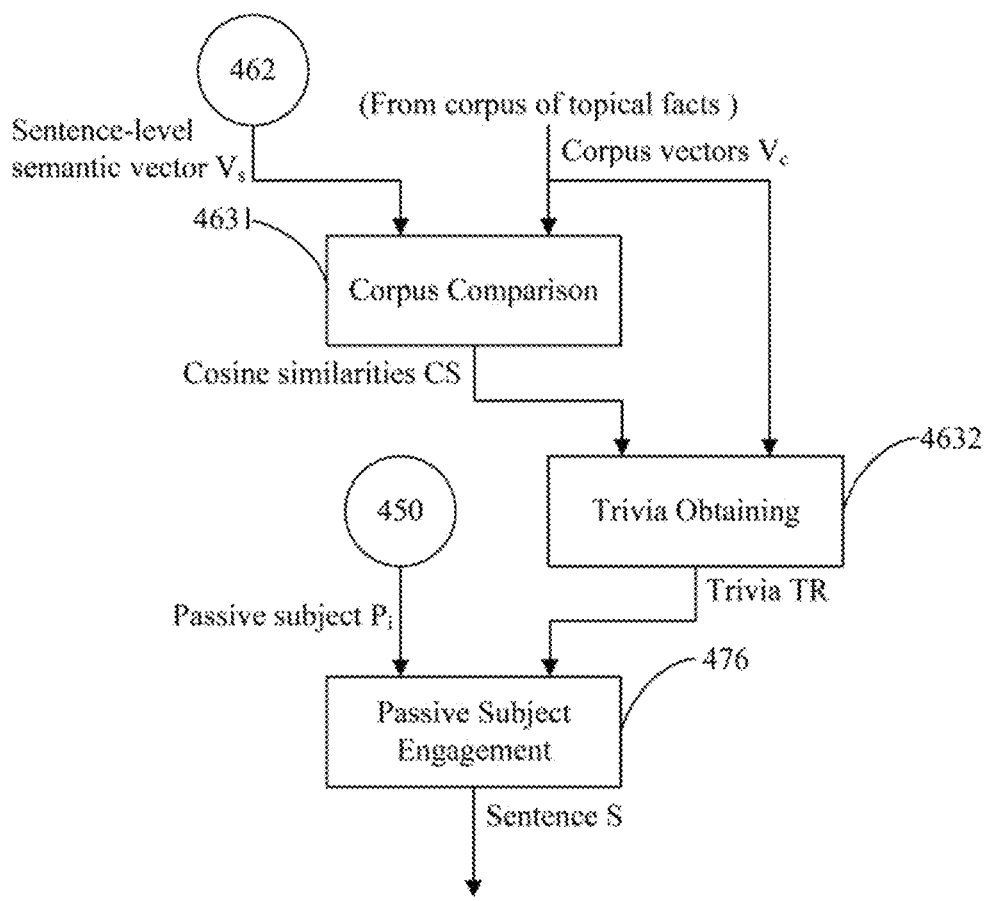
FIG. 11 is a schematic block diagram of an example of fact selection in the example of topic finding of FIG. 10.

FIG. 11 is a schematic block diagram of an example of fact selection in the example of topic finding of FIG. 10. In some embodiments, the fact F may be a trivia TR related to the topic T, and the pre-selected fact collection FC may be a corpus of topical facts including a plurality of single-sentence entries. The corpus of topical facts may be created by scrapping Wikipedia's Did you know (DYK). In prepossessing the corpus of topical facts, extremely short or long entries may be removed, and negative content (e.g., a disastrous flood of the River Thames killed 14 people) may be filtered out via a BERT-based sentiment analysis model trained on the Stanford Sentiment Treebank. Correspondingly, for realizing the fact selection (block 463 of FIG. 10), the processing unit 110 may compare a vector $V_c$ of each single-sentence entry in the corpus of topical facts with the sentence-level semantic vector $V_s$ (block 4631 of FIG. 11), and take the single-sentence entry of the vector $V_c$ with the closest cosine similarity CS to the sentence-level semantic vector $V_s$ as the trivia TR (block 4632 of FIG. 11). In some embodiments, the text encoding of block 462 and the fact selection of block 463 may be implemented through the conversation topic finder $S_9$ of the conversation facilitating system 1000. In the conversation topic finder $S_9$, the text X corresponding to M previous spoken sentences in the conversation is encoded into the sentence-level semantic vector $V_s$ first, then a fact in the pre-selected fact collection $S_{10}$ that has the closest cosine similarity to the sentence-level semantic vector $V_s$ is found. The pre-selected fact collection $S_{10}$ of the conversation facilitating system 1000 may be the pre-selected fact collection FC.

Figure 12:
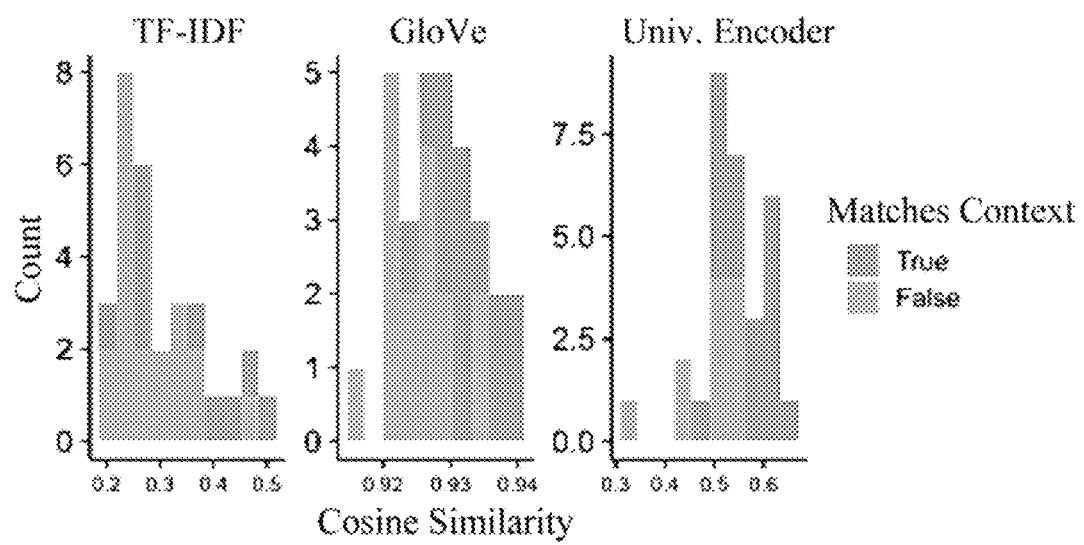
FIG. 12 is a schematic diagram of models for finding a trivia relevant to a conversation.

FIG. 12 is a schematic diagram of models for finding a trivia relevant to a conversation. Three different sentence-embedding models for the previous spoken sentences in the conversation and for the facts from the above-mentioned corpus of topical facts, that is, GloVe vector model at the middle part of FIG. 12, TF-IDF model at the left part of FIG. 12, and Universal Sentence Encoder model at the right part of FIG. 12, will be compared to investigate different means of finding the trivia relevant to the conversation. As an example, to test each model, 30 random 10-second transcripts of the Switchboard Corpus of telephone conversations are selected (these data are chose as a test set because the transcripts are of similar length and conversational style as we would expect for the models in use), each transcribed section is passed into each of the three models to compute embedding vectors, the trivia with the closest embedding vector in a fact collection is found for each model's embedding, and whether or not the found trivia is contextually relevant to what the participant H has just said is judged. As a result, it can be seen that both the GloVe vector model and the Universal Sentence Encoder model out-performed the baseline and matched with a relevant piece of trivia 14 and 20 times out of 30, respectively. That is not to say, however, that the models are at best, 66% accurate, but rather that a piece of trivia is not always relevant to a random snippet of a conversation. In addition, for both the gloVe and Universal Encoder models, there was a slight trend for contextually relevant pieces of trivia to have a relatively higher value for cosine similarity than the false positive trivia, suggesting that performance of these models can be greatly improved with the proper setting of the similarity threshold. Furthermore, the selection of the specific part of a conversation that is most conducive to finding an applicable fact for a non-participating speaker to contribute, that is, how many past spoken sentences to consider, would also important for improving performance.

In the conversation facilitating method, the processing unit 110 may further engage the passive subject $P_i$ by addressing the passive subject $P_i$ and speaking a sentence S related to the topic T through the speaker(s) S. (block 470 of FIG. 4). For example, the 3 participants H in FIG. 1 are Tony in the left of the robot 100 (participant $H_1$, i.e., the conversation starter), Mike in the right of the robot 100 (participant $H_3$, i.e., the passive subject $P_i$) and Laura in the center (participant 112):

Tony: Hey, guys. How are you?
Mike: Hi!
Laura: Hi, Tony. Do you like beer?
Tony: Yes, I do! What about you, Laura?
Laura: Of course! German beers are my favorite.
Tony: Oh, yes. I like German lagers, but Irish stout are my favorites.
Laura: I don't know anything about Irish beers.
Tony: I bet you do. Don't you know Guinness?
Laura: Ah yes, Guinness! I love that beer.
Robot (the robot 100): Hey Mike, do you know that the perceived smoothness of draft Guinness is due to its low level of carbon dioxide and the creaminess of its head is caused by the use of nitrogen gas?

After the 9 turns of dialogue, the robot 100 detected that Mike (i.e., the participant $H_3$) only spoke 1 time and addressed him with a sentence related to the topic T of the conversation (i.e., beer). In addition, when engaging the passive subject Pi, the robot 100 may move (e.g., make a turn) to align with the passive subject Pi. For example, if the robot 100 originally faces the front over to the table (i.e., the direction of the participant $H_2$), a slight turn to its right may be made to align with the passive subject $P_3$ (i.e., the participant $H_3$). After the fact selection (block 463 of FIG. 10), the processing unit 110 may speak the sentence S including the fact F through the speaker(s) S (block 471 of FIG. 10). After the trivia obtaining (block 4632 of FIG. 11), the processing unit 110 may speak the sentence S including the trivia TR through the speaker(s) S (block 476 of FIG. 10). In some embodiments, the passive subject engagement of block 470 may be implemented through the natural language processor $S_{11}$ and the text-to-speech convertor $S_{12}$ of the conversation facilitating system 1000. In the natural language processor $S_{11}$, when the found fact in the pre-selected fact collection $S_{10}$ surpasses the above-mentioned similarity threshold, the natural language processor $S_{11}$ formats a sentence containing the fact and the name of the passive subject $P_1$ using natural language processing (NLP). In the text-to-speech convertor $S_{12}$, the text of the formatted sentence is converted into speech using a cloud-based text-to-speech (T'S) system and to speak through the speaker $S_{13}$. The speaker $S_{13}$ of the conversation facilitating system 1000 may be the speaker(s) K.

The conversation facilitating method facilitates a multi-party conversation by identifying a passive subject from all the participants of the conversation through an auditory scene analysis and a visual scene analysis, and engaging the passive subject through a sentence related to the topic of the conversation. The multiparty conversation can be effectively facilitated because the passive subject will be accurately identified by combining the auditory and visual scene analyses, and the passive subject will be effectively engaged since the sentence related to the topic of the conversation will effectively interest the passive subject. The method may be executed by a service robot such as a companion robot, so as to serve the user who may have autism or other conversational barrier, thereby improving the widespread problems caused by lacking interactions between people in the modern society.

It can be understood by those skilled in the art that, all or part of the method in the above-mentioned embodiment(s) can be implemented by one or more computer programs to instruct related hardware. In addition, the one or more programs can be stored in a non-transitory computer readable storage medium. When the one or more programs are executed, all or part of the corresponding method in the above-mentioned embodiment(s) is performed. Any reference to a storage, a memory, a database or other medium may include non-transitory and/or transitory memory. Non-transitory memory may include read only memory (ROM), programmable ROM (PROM), electrically programmable ROM (EPROM), electrically erasable programmable ROM (EEPROM), flash memory, solid-state drive (SSD), or the like. Volatile memory may include random access memory (RAM), external cache memory, or the like.

The processing unit 110 (and the above-mentioned processor) may include central processing unit (CPU), or be other general purpose processor, digital signal processor (DSP), application specific integrated circuit (ASIC), field-programmable gate array (FPGA), or be other programmable logic device, discrete gate, transistor logic device, and discrete hardware component. The general purpose processor may be microprocessor, or the processor may also be any conventional processor. The storage unit 120 (and the above-mentioned memory) may include internal storage unit such as hard disk and internal memory. The storage unit 120 may also include external storage device such as plug-in hard disk, smart media card (SMC), secure digital (SD) card, and flash card.

The exemplificative units/modules and methods/steps described in the embodiments may be implemented through software, hardware, or a combination of software and hardware. Whether these functions are implemented through software or hardware depends on the specific application and design constraints of the technical schemes. The above-mentioned conversation facilitating method and electronic device may be implemented in other manners. For example, the division of units/modules is merely a logical functional division, and other division manner may be used in actual implementations, that is, multiple units/modules may be combined or be integrated into another system, or some of the features may be ignored or not performed. In addition, the above-mentioned mutual coupling/connection may be direct coupling/connection or communication connection, and may also be indirect coupling/connection or communication connection through some interfaces/devices, and may also be electrical, mechanical or in other forms.

The above-mentioned embodiments are merely intended for describing but not for limiting the technical schemes of the present disclosure. Although the present disclosure is described in detail with reference to the above-mentioned embodiments, the technical schemes in each of the above-mentioned embodiments may still be modified, or some of the technical features may be equivalently replaced, so that these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented conversation facilitating method, comprising:
providing a robot comprises a camera, a microphone, a speaker and a processor, wherein the camera, the microphone and the speaker are electrically connected to the processor;
obtaining, through the camera, one or more images of a plurality of participants of a conversation;
identifying, through the processor, the participants based on the one or more images;

localizing, through the processor, relative positions of the participants based on the one or more images;
detecting, through the microphone, a plurality of speeches of the conversation;
matching, through the processor, one of the participants to each of the detected speeches according to the relative positions of the participants and counting participations of the matched participant in the conversation;
identifying, through the processor, a passive subject from all the participants according to the participations of all the participants in the conversation;
finding, through the processor, a topic of the conversation between the participants; and
controlling, through the processor, the robot to move to align with the passive subject according to the relative position of the passive subject, and addressing, through the speaker, the passive subject and speaking a sentence related to the topic to engage the passive subject;
wherein the conversation comprises a plurality of turns of dialogue; the counting, through the processor, the participations of the participant in the conversation comprises:
counting, through the processor, a total speaking time of the matched participant during a last $\alpha N$ turns of dialogue in the conversation, wherein $\alpha$ is an integer greater than 0, N is a total number of the participations; and
the conversation comprises a plurality of turns of dialogue; the identifying, through the processor, the passive subject from all the participants according to the participations of all the participants in the conversation comprises:
identifying, through the processor, the participant with the total speaking time below 2 standard deviations of an average speaking time in the conversation during the last $\alpha N$ turns of dialogue as the passive subject.

2. The method of claim 1, wherein the finding, through the processor, the topic of the conversation between the participants comprises:
transcribing, through the processor, each utterance in the speeches of the conversation into a text;
encoding, through the processor, the text corresponding to one or more spoken sentences in the conversation into a sentence-level semantic vector, wherein the sentence-level semantic vector is an embedding or dense vector and represents a meaning of a word or sentence; and
selecting, through the processor, a fact with a closest similarity to the sentence-level semantic vector from a pre-selected fact collection, wherein the similarity meets a threshold; and
the speaking the sentence related to the topic through the speaker comprises:
speaking the sentence comprising the fact through the speaker.

3. The method of claim 2, wherein the fact is a trivia related to the topic, and the pre-selected fact collection is a corpus of topical facts comprising a plurality of single-sentence entries; and the selecting, through the processor, the fact with the closest similarity to the sentence-level semantic vector from the pre-selected fact collection comprises:
comparing, through the processor, a vector of each single-sentence entry in the corpus of topical facts with the sentence-level semantic vector; and
taking, through the processor, the single-sentence entry of the vector with a closest cosine similarity to the sentence-level semantic vector as the trivia; and
the speaking the sentence related to the topic through the speaker comprises:
speaking the sentence comprising the trivia through the speaker.

4. The method of claim 2, wherein the microphone is a microphone array comprising a plurality of microphones disposed on a head of the robot in a circular fashion;
the detecting, through the microphone, the speeches of the conversation comprises:
receiving, through the microphone array, an audio; and
detecting, through the processor, the speeches of the conversation from the audio using voice activity detection to send a detected audio to an automatic speech recognition engine;
the transcribing each utterance in the speeches of the conversation into the text comprises:
transcribing, through the automatic speech recognition engine, each utterance in the speeches of the conversation into the text based on the detected audio; and
the matching, through the processor, one of the participants to each of the detected speeches according to the relative positions of the participants comprises:
matching, through the processor, each of the participants with a direction of arrival based on a number and the relative positions of the participants, wherein the direction of arrival represents an angle of a voice of each of the participants to arrive the microphone, and a range of the direction of arrival is between 0 and 180 degrees.

5. The method of claim 2, wherein the speaking the sentence comprising the fact through the speaker comprises:
formatting, through the processor, the sentence comprising the fact using natural language processing; and
converting, through the processor, the sentence into speech using a text-to-speech convertor, and speaking, through the speaker, the sentence comprising the fact; and
wherein the robot further comprises a screen, and the method further comprises:
showing, through the screen, facial expressions to the passive subject.

6. The method of claim 1, wherein the counting, through the processor, the participations of the participant in the conversation further comprises:
counting, through the processor, a number of participation of the matched participant during the last $\alpha N$ turns of dialogue in the conversation; and
the identifying, through the processor, the passive subject from all the participants according to the participations of all the participants in the conversation further comprises:
identifying, through the processor, the participant with the number of participation less than $\beta$ times during the last $\alpha N$ turns of dialogue as the passive subject, wherein $\beta$ is an integer smaller than $\alpha$ and greater than 0.

7. The method of claim 1, further comprising:
navigating, through the processor, the robot to move and avoid obstacles in an environment of the conversation according to a planned trajectory during the conversation to detect the participants in a dynamic manner; and
in response to a change in the topic or the participants, returning to perform the step of obtaining, through the camera, the one or more images of the plurality of participants of the conversation.

8. An electronic device, comprising:
a camera;
a microphone;
a speaker;
one or more processors; and
one or more memories storing one or more programs configured to be executed by the one or more processors, wherein the electronic device is a robot, and the one or more programs comprise instructions to:
obtain, through the camera, one or more images of a plurality of participants of a conversation;
identify the participants based on the one or more images;
localize relative positions of the participants based on the one or more images;
detect a plurality of speeches of the conversation through the microphone;
match one of the participants to each of the detected speeches according to the relative positions of the participants and count participations of the matched participant in the conversation;
identify a passive subject from all the participants according to the participations of all the participants in the conversation;
find a topic of the conversation between the participants; and
control the robot to move to align with the passive subject according to the relative position of the passive subject, and address the passive subject and speak a sentence related to the topic through the speaker to engage the passive subject;
wherein the conversation comprises a plurality of turns of dialogue; the counting the participations of the participant in the conversation comprises:
counting a total speaking time of the matched participant during a last $\alpha N$ turns of dialogue in the conversation, wherein $\alpha$ is an integer greater than 0, N is a total number of the participations; and
the conversation comprises a plurality of turns of dialogue; the identifying the passive subject from all the participants according to the participations of all the participants in the conversation comprises:
identifying the participant with the total speaking time below 2 standard deviations of an average speaking time in the conversation during the last $\alpha N$ turns of dialogue as the passive subject.

9. The electronic device of claim 8, wherein the finding the topic of the conversation between the participants comprises:
transcribing each utterance in the speeches of the conversation into a text;
encoding the text corresponding to one or more spoken sentences in the conversation into a sentence-level semantic vector; and
selecting a fact with a closest similarity to the sentence-level semantic vector from a pre-selected fact collection, wherein the similarity meets a threshold; and
the speaking the sentence related to the topic through the speaker comprises:
speaking the sentence comprising the fact through the speaker.

10. The electronic device of claim 9, wherein the fact is a trivia related to the topic, and the pre-selected fact collection is a corpus of topical facts comprising a plurality of single-sentence entries; and the selecting the fact with the closest similarity to the sentence-level semantic vector from the pre-selected fact collection comprises:
comparing a vector of each single-sentence entry in the corpus of topical facts with the sentence-level semantic vector; and
taking the single-sentence entry of the vector with a closest cosine similarity to the sentence-level semantic vector as the trivia; and
the speaking the sentence related to the topic through the speaker comprises:
speaking the sentence comprising the trivia through the speaker.

11. The electronic device of claim 9, wherein the detecting the speeches of the conversation through the microphone comprises:
receiving an audio through the microphone; and
detecting the speeches of the conversation from the audio using voice activity detection to send a detected audio to an automatic speech recognition engine; and
the transcribing each utterance in the speeches of the conversation into the text comprises:
transcribing, through the automatic speech recognition engine, each utterance in the speeches of the conversation into the text based on the detected audio.

12. The electronic device of claim 9, wherein the speaking the sentence comprising the fact through the speaker comprises:
formatting the sentence comprising the fact using natural language processing; and
converting the sentence into speech using a text-to-speech convertor to speak through the speaker.

13. The electronic device of claim 8, wherein the counting the participations of the participant in the conversation further comprises:
counting a number of participation of the matched participant during the last $\alpha N$ turns of dialogue in the conversation; and
the identifying the passive subject from all the participants according to the participations of all the participants in the conversation further comprises:
identifying the participant with the number of participation less than $\beta$ times during the last $\alpha N$ turns of dialogue as the passive subject, wherein $\beta$ is an integer smaller than $\alpha$ and greater than 0.

14. A non-transitory computer readable storage medium storing one or more programs, wherein the one or more programs comprise instructions, which when executed by a robot having a camera, a microphone, and a speaker, cause the robot to:
obtain, through the camera, one or more images of a plurality of participants of a conversation;
identify the participants based on the one or more images;
localize relative positions of the participants based on the one or more images;
detect a plurality of speeches of the conversation through the microphone;
match one of the participants to each of the detected speeches according to the relative positions of the participants and count participations of the matched participant in the conversation;
identify a passive subject from all the participants according to the participations of all the participants in the conversation;
find a topic of the conversation between the participants; and
control the robot to move to align with the passive subject according to the relative position of the passive subject, and address the passive subject and speak a sentence related to the topic through the speaker to engage the passive subject;

wherein the conversation comprises a plurality of turns of dialogue; the counting the participations of the participant in the conversation comprises:

counting a total speaking time of the matched participant during a last αN turns of dialogue in the conversation, wherein a is an integer greater than 0, N is a total number of the participations; and the conversation comprises a plurality of turns of dialogue; the identifying the passive subject from all the participants according to the participations of all the participants in the conversation comprises:

identifying the participant with the total speaking time below 2 standard deviations of an average speaking time in the conversation during the last αN turns of dialogue as the passive subject.

15. The storage medium of claim 14, wherein the finding the topic of the conversation between the participants comprises:

transcribing each utterance in the speeches of the conversation into a text;

encoding the text corresponding to one or more spoken sentences in the conversation into a sentence-level semantic vector; and selecting a fact with a closest similarity to the sentence-level semantic vector from a pre-selected fact collection, wherein the similarity meets a threshold; and the speaking the sentence related to the topic through the speaker comprises:

speaking the sentence comprising the fact through the speaker.

16. The storage medium of claim 15, wherein the fact is a trivia related to the topic, and the pre-selected fact collection is a corpus of topical facts comprising a plurality of single-sentence entries; and the selecting the fact with the closest similarity to the sentence-level semantic vector from the pre-selected fact collection comprises:

comparing a vector of each single-sentence entry in the corpus of topical facts with the sentence-level semantic vector; and taking the single-sentence entry of the vector with a closest cosine similarity to the sentence-level semantic vector as the trivia; and the speaking the sentence related to the topic through the speaker comprises:

speaking the sentence comprising the trivia through the speaker.

17. The storage medium of claim 15, wherein the detecting the speeches of the conversation through the microphone comprises:

receiving an audio through the microphone; and detecting the speeches of the conversation from the audio using voice activity detection to send a detected audio to an automatic speech recognition engine; and the transcribing each utterance in the speeches of the conversation into the text comprises:

transcribing, through the automatic speech recognition engine, each utterance in the speeches of the conversation into the text based on the detected audio.

18. The storage medium of claim 14, wherein the counting the participations of the participant in the conversation further comprises:

counting a number of participation of the matched participant during the last αN turns of dialogue in the conversation; and the identifying the passive subject from all the participants according to the participations of all the participants in the conversation further comprises:

identifying the participant with the number of participation less than β times during the last αN turns of dialogue as the passive subject, wherein β is an integer smaller than α and greater than 0.

* * * * *